(12) United States Patent
Gong

(10) Patent No.: US 9,470,879 B2
(45) Date of Patent: Oct. 18, 2016

(54) OPTICAL IMAGING SYSTEM

(71) Applicant: Union Optech Co., Ltd., Zhongshan (CN)

(72) Inventor: Junqiang Gong, Zhongshan (CN)

(73) Assignee: UNION OPTECH CO., LTD., Zhongshan (CN)

( * ) Notice: Subject to any disclaimer, the term of this patent is extended or adjusted under 35 U.S.C. 154(b) by 0 days.

(21) Appl. No.: 14/622,786

(22) Filed: Feb. 13, 2015

(65) Prior Publication Data

US 2015/0293329 A1  Oct. 15, 2015

(30) Foreign Application Priority Data

Apr. 15, 2014  (CN) .......................... 2014 1 0150980

(51) Int. Cl.
*G02B 15/14* (2006.01)
*G02B 13/00* (2006.01)

(52) U.S. Cl.
CPC ......... *G02B 13/009* (2013.01); *G02B 13/0065* (2013.01); *G02B 15/14* (2013.01)

(58) Field of Classification Search
CPC . G02B 13/009; G02B 13/0065; G02B 15/14

USPC .......................... 359/627, 691, 694, 726, 733
See application file for complete search history.

(56) References Cited

U.S. PATENT DOCUMENTS

| | | | | |
|---|---|---|---|---|
| 7,573,647 B2 * | 8/2009 | Matsumoto et al. | | G02B 15/173 359/676 |
| 2002/0097497 A1 * | 7/2002 | Kamo | ..................... | G02B 15/14 359/629 |
| 2009/0219628 A1 * | 9/2009 | Eguchi | ..................... | G02B 7/08 359/694 |
| 2014/0111650 A1 * | 4/2014 | Georgiev | .............. | G06T 3/4038 348/159 |

\* cited by examiner

*Primary Examiner* — Ricky Mack
*Assistant Examiner* — Daniele Manikeu
(74) *Attorney, Agent, or Firm* — Matthias Scholl, PC; Matthias Scholl

(57) ABSTRACT

An optical imaging system, including a fixed lens group, a movable lens group, a first reflective optical element, a second reflective optical element, and an imaging surface. The movable lens group is driven to move by a driving mechanism. The first reflective optical element is disposed at one end of an object space and the second reflective optical element is disposed at one end of an image space. The imaging surface is disposed at one side of the second reflective optical element to receive emergent rays from the second reflective optical element.

6 Claims, 2 Drawing Sheets

OPTICAL IMAGING SYSTEM

CROSS-REFERENCE TO RELATED APPLICATIONS

Pursuant to 35 U.S.C. §119 and the Paris Convention Treaty, this application claims the benefit of Chinese Patent Application No. 201410150980.3 filed Apr. 15, 2014, the contents of which are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

1. Field of the Invention

The invention relates to an optical imaging system.

2. Description of the Related Art

With the improvement of imaging resolution and the application of zoom optical systems, the size of the optical elements and the volume of the imaging system are increasingly large, which cannot meet the requirements of thin smartphones and small-size tablet PCs.

SUMMARY OF THE INVENTION

In view of the above-described problems, it is one objective of the invention to provide an optical imaging system. Smartphones, tablet PCs, and card digital camera equipped with the optical imaging system feature thin thickness and small size.

To achieve the above objective, in accordance with one embodiment of the invention, there is provided an optical imaging system, comprising a fixed lens group, a movable lens group, a first reflective optical element, a second reflective optical element, and an imaging surface. The movable lens group is driven by a driving mechanism to move. The first reflective optical element is disposed at one end of an object space and the second reflective optical element is disposed at one end of an image space. The imaging surface is disposed at one side of the second reflective optical element to receive an emergent ray from the second reflective optical element.

In a class of this embodiment, an included angle between an incident ray and a corresponding emergent ray thereof of the first and second reflective optical elements is 90°.

In a class of this embodiment, the first and second reflective optical elements are a plane mirror or an isosceles right prism.

In a class of this embodiment, an included angle between a reflecting surface of the first and/or the second reflective optical elements and an optical axis of the system is 45°.

In a class of this embodiment, the fixed lens group comprises a first fixed lens group and a second fixed lens group which is disposed at the object space; the movable lens group comprises a first movable zoom lens group and a second movable zoom lens group which is disposed at the image space; and the first fixed lens group is disposed between the first movable zoom lens group and the second movable zoom lens group.

In a class of this embodiment, the second fixed lens group comprises a first lens configured to receive an outer incident ray and a second lens disposed behind the first lens, and the first reflective optical element is disposed between the first lens and the second lens.

In a class of this embodiment, the first reflective optical element, the second lens, the first movable zoom lens group, the first fixed lens group, the second movable zoom lens group, and the second reflective optical element all fall on a same horizontal optical axis.

Advantages according to embodiments of the invention are summarized as follows:

1. The optical imaging system enables a high definition zoom camera to have a physical thickness of 6.0 mm or below.

2. The optical imaging system comprises a plurality of reflective optical elements, a fixed lens group and a movable lens group, which are not overlapped and can be used for manufacturing smartphones, tablet PCs, and card digital camera with thin thickness and small size.

3. The optical imaging system comprises two reflective optical elements disposed at the object space and the image space, respectively, for reflecting the incident ray and the refractive ray. The fixed lens group and the movable lens group fall on the same optical axis, the lens refracting the incident ray and the imaging surface are disposed in another plane vertical to the optical axis and staggered with one another, thereby preventing the overlapping of the optical components and achieving the thin thickness of the optical system.

DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing an optical imaging system are described below. It should be noted that the following examples are intended to describe and not to limit the invention.

Figure 1:
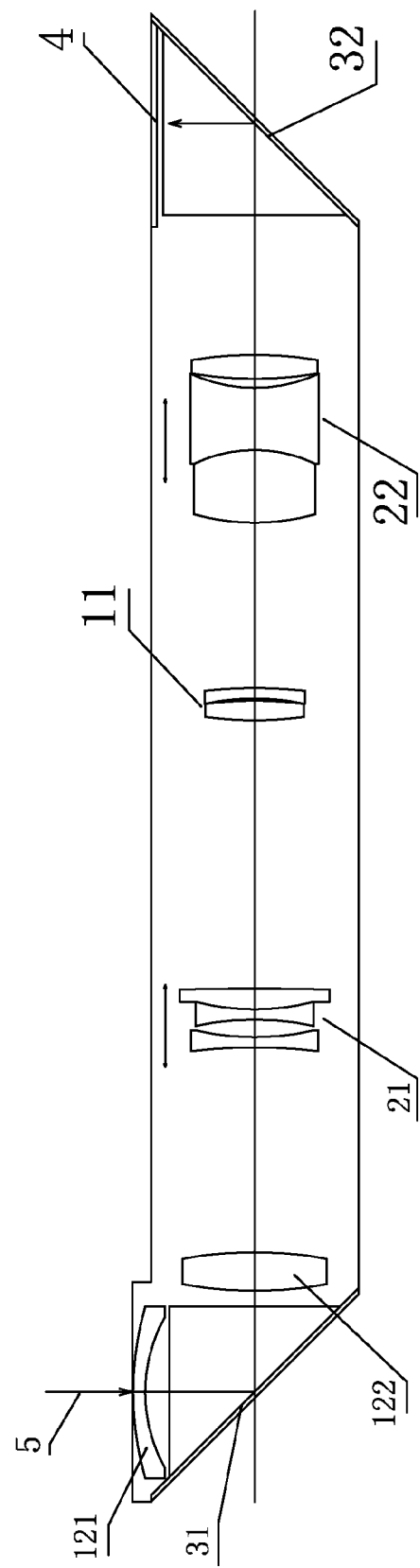
FIG. 1 is a structure diagram of an optical imaging system in accordance with Example 1.
Figure 2:
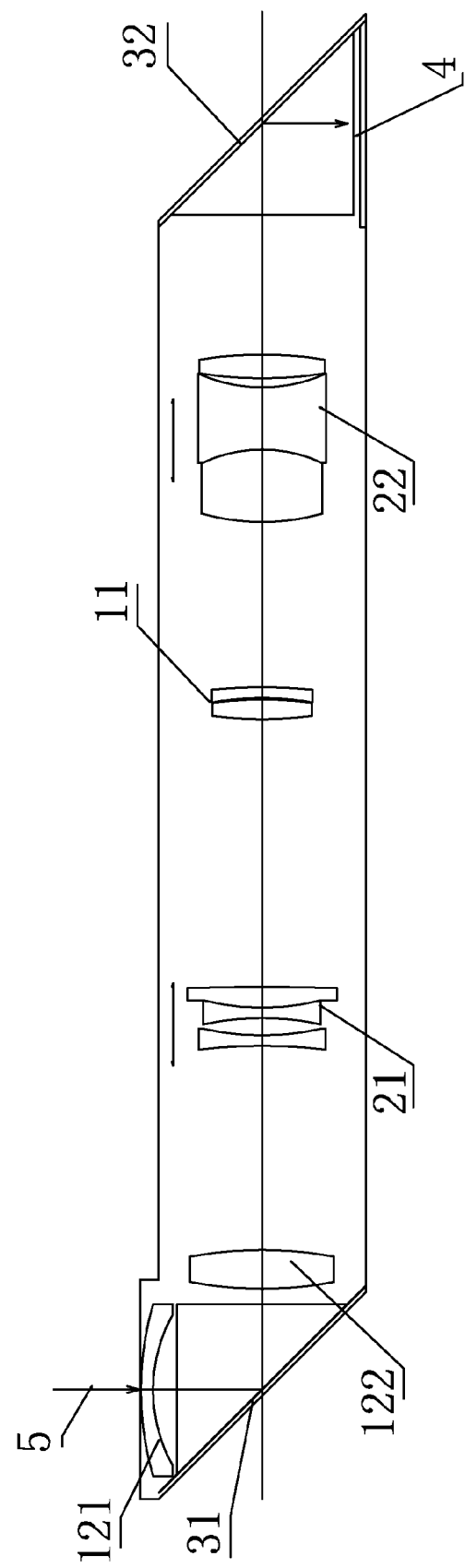
FIG. 2 is a structure diagram of an optical imaging system in accordance with Example 2.

As shown in FIGS. 1 and 2, an optical imaging system comprises a fixed lens group, a movable lens group, a first reflective optical element 31, a second reflective optical element 32, and an imaging surface 4. The movable lens group is driven by a driving mechanism to move. The first reflective optical element is disposed at one end of an object space and the second reflective optical element is disposed at one end of an image space. The imaging surface is disposed at one side of the second reflective optical element to receive an emergent ray from the second reflective optical element. The imaging surface often employs a sensitive element.

Preferably, an included angle between an incident ray and a corresponding emergent ray thereof of the first and second reflective optical elements is 90°. To achieve the angle, the first and second reflective optical elements are a plane mirror or an isosceles right prism.

An included angle between a reflecting surface of the first and/or the second reflective optical elements and an optical axis of the system is 45°. To achieve the angle, the fixed lens group and the movable lens group fall on the same optical axis, the lens refracting the incident ray and the imaging surface 4 are disposed in another plane vertical to the optical axis and staggered with one another, thereby preventing the overlapping of the optical components and achieving the thin thickness of the optical system.

Specifically, the fixed lens group comprises a first fixed lens group 11 and a second fixed lens group which is disposed at the object space; the movable lens group comprises a first movable zoom lens group 21 and a second movable zoom lens group 22 which is disposed at the image space; and the first fixed lens group 11 is disposed between the first movable zoom lens group 21 and the second movable zoom lens group 22.

The second fixed lens group comprises a first lens 121 configured to receive an outer incident ray and a second lens 122 disposed behind the first lens, and the first reflective optical element 31 is disposed between the first lens 121 and the second lens 122.

The first reflective optical element 31, the second lens 122, the first movable zoom lens group 21, the first fixed lens group 11, the second movable zoom lens group 22, and the second reflective optical element 32 all fall on the same horizontal optical axis. The firs lens 121 and the imaging surface 4 are disposed in another plane vertical to the optical axis and staggered with one another.

Example 1

As shown in FIG. 1, an incident ray 5 is refracted by the first lens 121 of the second fixed lens group, and then reflected by the first reflective optical element at the object space. The reflecting angle is 45°. The ray passes through in order the second lens 122 of the second fixed lens group, the first movable zoom lens group 21, the first fixed lens group 11, and the second movable zoom lens group 22, and is finally reflected by the second reflective optical element 32 with an reflecting angle of 45°. The reflection ray is parallel to the original incident ray and reflected upwards on the imaging surface for imaging.

In the optical imaging system, the first movable zoom lens group 21 and the second movable zoom lens group 22 are driven by a driving mechanism to move on the optical axis whereby achieving the zooming of the optical system. When the first movable zoom lens group 21 moves towards the object space, the focal distance decreases; when the first movable zoom lens group 21 moves towards the image space, the focal distance increases. Meanwhile, when the first movable zoom lens group 21 moves for zooming, the second movable zoom lens group 22 also moves correspondingly for zooming, until a clear image is obtained.

Example 2

As shown in FIG. 2, an incident ray 5 is refracted by the first lens 121 of the second fixed lens group, and then reflected by the first reflective optical element at the object space. The reflecting angle is 45°. The ray passes through in order the second lens 122 of the second fixed lens group, the first movable zoom lens group 21, the first fixed lens group 11, and the second movable zoom lens group 22, and is finally reflected by the second reflective optical element 32 with an reflecting angle of 45°. The reflection ray is parallel to the original incident ray and reflected downwards on the imaging surface for imaging.

In the optical imaging system, the first movable zoom lens group 21 and the second movable zoom lens group 22 are driven by a driving mechanism to move on the optical axis whereby achieving the zooming of the optical system. When the first movable zoom lens group 21 moves towards the object space, the focal distance decreases; when the first movable zoom lens group 21 moves towards the image space, the focal distance increases. Meanwhile, when the first movable zoom lens group 21 moves for zooming, the second movable zoom lens group 22 also moves correspondingly for zooming, until a clear image is obtained.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An optical imaging system for capturing an image of an object, comprising:
   a) a fixed lens group, said fixed lens group comprising a first fixed lens group and a second fixed lens group; said second fixed lens group having a first lens and a second lens;
   b) a movable lens group, said movable lens group comprising a first movable zoom lens group and a second movable zoom lens group;
   c) a first reflective optical element;
   d) a second reflective optical element; and
   e) an imaging surface;
   wherein:
   said first reflective optical element is disposed around an object space and said second reflective optical element is disposed around an image space;
   said first lens is disposed around the object space and is adapted to receive an incident ray from the object;
   said imaging surface is disposed around and opposite to said second reflective optical element to receive an emergent ray for forming the image of the object;
   said first lens, said first reflective optical element, said second lens, said first movable zoom lens group, said first fixed lens group, said second movable zoom lens group, said second reflective optical element, and said imaging surface are arranged sequentially starting from the object space whereby an optical path of said optical imaging system extends in order from said first lens, to said first reflective optical element, to said second lens, to said first movable zoom lens group, to said first fixed lens group, to said second movable zoom lens group, to said second reflective optical element, and to said imaging surface;
   said first reflective optical element, said second lens, said first movable zoom lens group, said first fixed lens group, said second movable zoom lens group, and said second reflective optical element are disposed on an optical axis of said optical imaging system and are in order from the object space to the image space;
   said first movable zoom lens group is movable along said optical axis for changing a focal distance of said optical imaging system;
   said second movable zoom lens group is movable along said optical axis for realizing focus operation of said optical imaging system;
   said first lens is adapted to transform the incident ray from the object to a ray perpendicular to said optical axis;
   light incident on said first reflective optical element is reflected by a 90° diversion, and light incident on said second reflective optical element is reflected by a 90° diversion; and
   the emergent ray for forming the image of the object is perpendicular to said optical axis.

2. The system of claim 1, wherein said first and second reflective optical elements are a plane mirror or an isosceles right prism.

3. The system of claim 2, wherein a first included angle between a reflecting surface of said first reflective optical element and said optical axis is 45°, and a second included angle between a reflecting surface of said second reflective optical element and said optical axis is 45°.

4. The system of claim 1, wherein said first lens and said imaging surface are disposed away from said optical axis.

5. The system of claim 1, wherein said first lens is disposed substantially parallel to said optical axis.

6. The system of claim 1, wherein said imaging surface is disposed parallel to said optical axis.

* * * * *